United States Patent [19]

Persak et al.

[11] Patent Number: 4,574,443
[45] Date of Patent: Mar. 11, 1986

[54] PIPE PUNCH DEVICE

[75] Inventors: Steven R. Persak, Linden; John Hudak, Jr., Basking Ridge, both of N.J.

[73] Assignee: Exxon Research and Engineering Co., Florham Park, N.J.

[21] Appl. No.: 623,003

[22] Filed: Jun. 21, 1984

[51] Int. Cl.[4] ............................................. F16K 41/04
[52] U.S. Cl. ................. 29/157.1 R; 29/33 T; 137/318; 408/1 R
[58] Field of Search ............... 29/157.1 R, 432, 237, 29/798, 33 T; 408/1; 137/317-323, 15

[56] References Cited

U.S. PATENT DOCUMENTS

| | | | |
|---|---|---|---|
| 3,198,206 | 8/1965 | O'Brien | 137/318 X |
| 3,287,997 | 11/1966 | McMurray et al. | 77/42 |
| 3,480,036 | 11/1969 | Ehrens et al. | 137/318 |
| 3,554,217 | 1/1971 | Ehrens et al. | 137/321 X |
| 3,896,842 | 7/1975 | Cole | 137/318 |
| 4,127,141 | 11/1978 | Ledonne et al. | 137/318 X |

Primary Examiner—Frank T. Yost
Attorney, Agent, or Firm—Joseph J. Dvorak

[57] ABSTRACT

A rotary threaded penetrator bolt means having a tubular hollow pin therein is employed to contact against a hardened cylindrical punch means to linearly advance the punch without rotation thereof through the wall thickness of the fluid containing member desired to be pierced. In such arrangement, if the wall thickness of the fluid containing member is sufficiently great, it may be desirable to pre-drill a punch receiving cylindrical recess therein prior to operation of the penetrator bolt means. In addition, prior to insertion of the penetrator bolt means in its receiver means affixed to the fluid containing member, the invention utilizes a seal packing material wrapped about a protruding end portion of the pin means so that upon threaded insertion of the penetrator bolt into the receiver means, a gradual compression of the seal material will occur to create a fluid tight seal about the exterior of the pin means as well as between the receiver means and the outer wall of the fluid containing member prior to actual penetration of the punch through the member wall.

11 Claims, 7 Drawing Figures

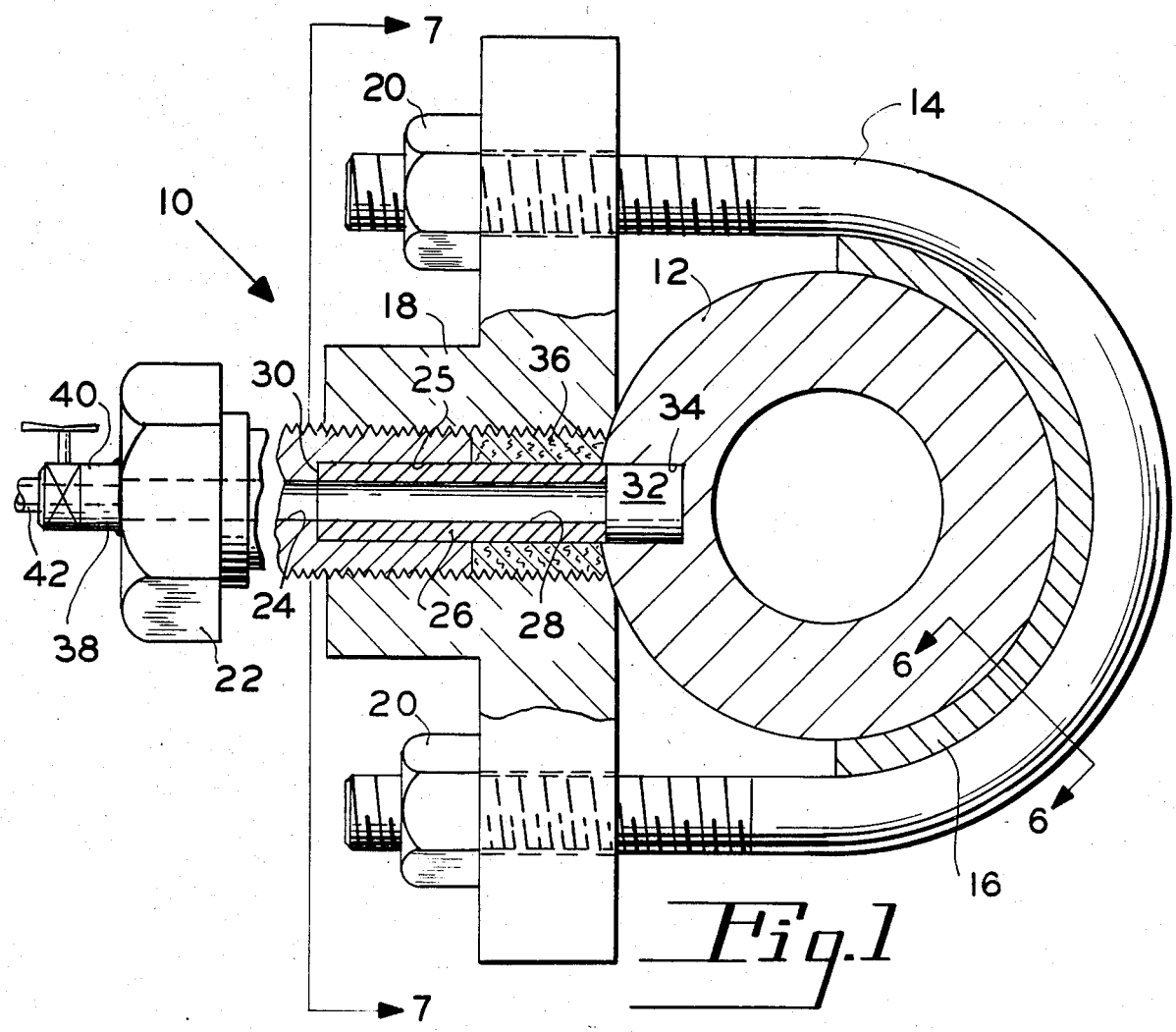
Fig.1
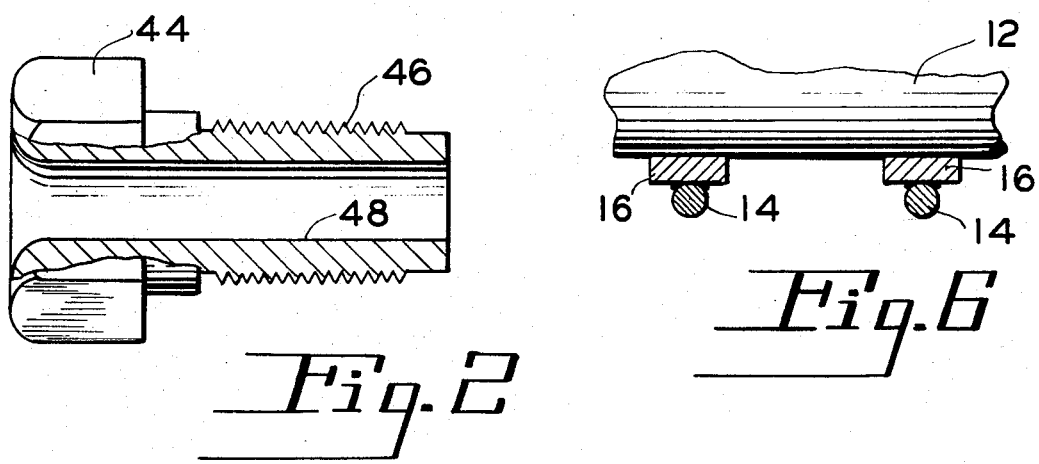
Fig.2
Fig.6

4,574,443

PIPE PUNCH DEVICE

BACKGROUND OF THE INVENTION

The field of the invention relates to devices for piercing the wall of a fluid containing member such as a pipe or conduit in order to place the interior of the fluid carrying member in fluid communication with another container or conduit.

Prior art devices for accomplishing this general objective are illustrated in U.S. patents such as Ehrens, U.S. Pat. No. 3,554,217; Cole, U.S. Pat. No. 3,896,842; and McMurray et al, U.S. Pat. No. 3,287,997. In such prior art devices it has been customary to fasten the piercing or tapping means to the exterior wall of a pipe with suitable sealing means. In operating such devices it is typical to employ a rotary screw threaded tapping means having an end configuration either to pierce or puncture the wall of the container vessel or for rotary cutting of a slug from the wall of the conduit. In all such instances a rotating sharp ended tool member does the gradual cutting or piercing through the wall thickness of the conduit.

SUMMARY OF THE INVENTION

In contrast to such prior art rotating cutting tool devices, applicants' invention employs an arrangement wherein a rotary threaded penetrator bolt means having a tubular hollow pin therein is employed to contact against a hardened cylindrical punch means to linearly advance the punch without rotation thereof through the wall thickness of the fluid containing member desired to be pierced. In such arrangement, if the wall thickness of the fluid containing member is sufficiently great, it may be desirable to pre-drill a punch receiving cylindrical recess therein prior to operation of the penetrator bolt means. In addition, prior to insertion of the penetrator bolt means in its receiver means affixed to the fluid containing member, the invention utilizes a seal packing material wrapped about a protruding end portion of the pin means so that upon threaded insertion of the penetrator bolt into the receiver means, a gradual compression of the seal material will occur to create a fluid tight seal about the exterior of the pin means as well as between the receiver means and the outer wall of the fluid containing member prior to actual penetration of the punch through the member wall.

The foregoing arrangement of parts including the intermediate hollow tubular pin means surrounded by packing material adapted to rotate alternatively with the penetrator bolt means or rotate relative thereto is effective to linearly advance the punch through the pipe wall without imposing great torsional stresses on the punch which would otherwise occur if the punching member itself were integral with the end of the penetrator means as in the prior art. Accordingly, applicants' arrangement is effective to produce a new and novel punching means wherein the punch stresses are mainly in compression and torsional loads thereon are substantially reduced.

A still further object of the separate sacrificial cylindrical punch, in addition to reducing torsional stresses, is to insure that the sheared slug will be cleanly removed from the newly formed hole, and should the slug have a tendency to adhere to said punch, both punch and slug are free to pass into the interiors of the vessel or conduit.

Another aspect of the present invention is to provide an improved method for forming the hole in a fluid containing member wherein a threaded receiving means is first attached to said member and thereafter a threaded drill jig bushing is employed to permit drilling of a cylindrical recess partially through the wall thickness of the fluid containing member; thereafter removing the drill jig bushing and replacing it with a threaded penetrator bolt means carrying the rotatable hollow pin member and seal packing thereon. The method contemplates the further threading of the penetrator bolt means into the receiver to advance the punch means through the wall thickness of the container member and to seal the packing against the pin and container prior to actual penetration of the fluid containing member by the cylindrical punch.

Accordingly, it is a principal object of the present invention to provide a new and improved assembly and method for forming a hole in the wall of a fluid containing member such as a conduit.

Another object of the invention is to provide a new and improved pipe tapping device wherein a cylindrical punch is advanced linearly without rotation through the pipe wall to pierce the pipe wall and enter the interior of the pipe to place a hollow pin following the cylindrical punch in fluid communication with the interior of said pipe.

A still further object of the invention is to provide a pipe wall piercing apparatus and method wherein the relative forces between the various parts thereof are mainly in compression without any torsional stress being imparted to the cylindrical punch entering the piped wall.

A still further object of the invention is to provide a fluid containing member piercing assembly which is simple in design, rugged in construction, reliable in operation, and economical to manufacture.

These and other objects and advantages will become apparent from a consideration of the several preferred embodiments which follow.

BRIEF DESCRIPTION OF THE DRAWINGS

FIG. 1 is a partial cross-sectional view of a preferred embodiment of the invention as employed upon a fluid carrying conduit.

FIG. 2 is a view of a drill jig bushing as employed to pre-drill the punch receiving recess in the wall of the container vessel to be pierced.

FIG. 6 is a partial sectional view taken along line 6—6 of FIG. 1.

DETAILED DESCRIPTION OF THE INVENTION

Figure 3:
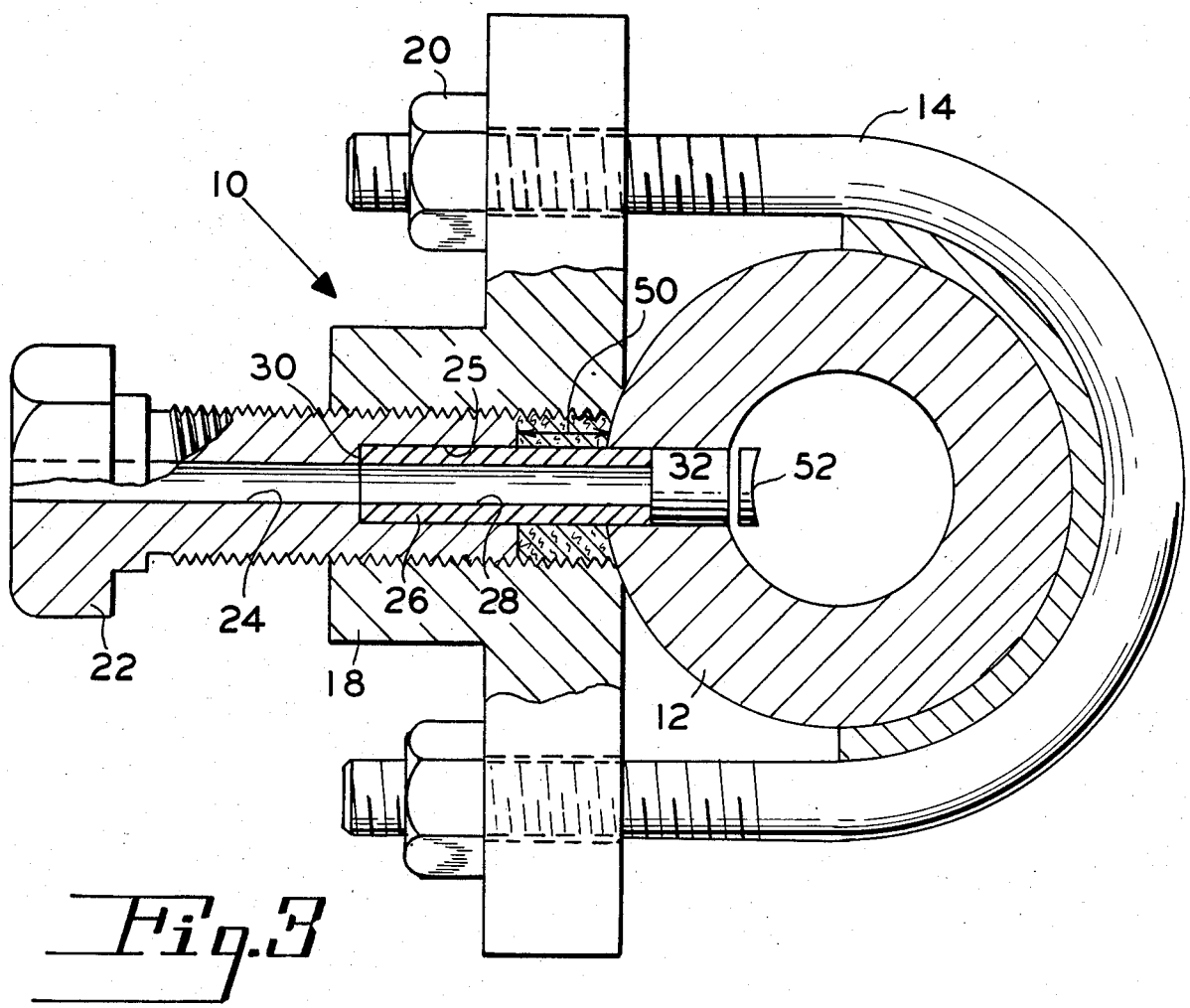
FIG. 3 is a view similar to FIG. 1 after the penetrator bolt means has been advanced sufficiently to sever the thickness of the pipe wall.
Figure 7:
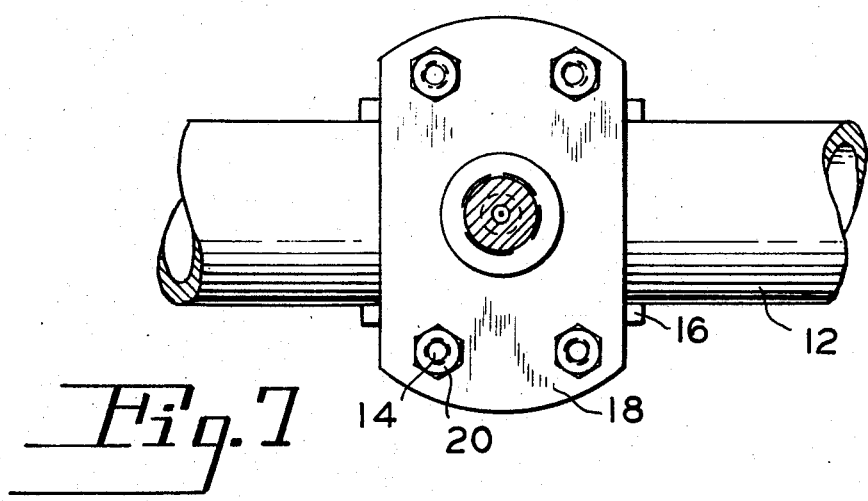
FIG. 7 is a plan view of the assembly of FIG. 1 looking in the direction of arrows 7—7.

It will be understood that the drawings illustrate merely representative and preferred embodiments of the invention and that other embodiments are contemplated within the scope of the claims hereafter set forth.

Referring to the drawings and to FIG. 1 in particular, a pipe punch assembly shown generally at 10 surrounds a conduit or pipe 12. The assembly 10 is fastened to the conduit 12 through the use of a pair of spaced "U" bolts 14 to which semicircular spacers 16 are attached by appropriate tack welds (see FIG. 6). The assembly 10 includes a yoke or receiver plate means 18 which is secured to the threaded ends of the "U" bolts 14 by a plurality of nuts 20. The receiver means 18 includes a central threaded portion into which a bolt or penetrator means 22 has been threaded. The penetrator means 22 includes a central aperture or passageway 24 having an enlarged central bore portion 25 terminating at a shoulder 30. An intermediate punch or hollow pin means 26 is slidably located within the enlarged bore 25 of the penetrator means 22 and seats against the shoulder 30 but is free to rotate within said bore. The hollow tubular pin means 26 includes a central aperture or passageway 28 of the same diameter as passageway 24 in the penetrator means 22 to form along therewith an axial fluid conducting passageway through the penetrator means. The extending end of the pin means 26 is in abutting contact with a cylindrical punch 32 placed in a receiving aperture 34 formed in the side wall of the conduit 12. Disposed about the outer periphery of the extending end portion of the pin means 26 is preferably a seal packing which may be of a ribbon variety sold under the tradename GRAFOIL. The packing 36 may be spirally wrapped about the pin means 26 acting as a mandrel therefor prior to threaded insertion of the penetrator means 22 into the receiver 18. The head end of the penetrator means 22 includes any suitable valve 40 affixed thereto through a nipple 38 to place the interior of the conduit 12 in fluid communication through the passageway 28,24 with a connecting conduit 42 upon completion of punch penetration through the side wall of the conduit 12 as later described.

Figure 4:
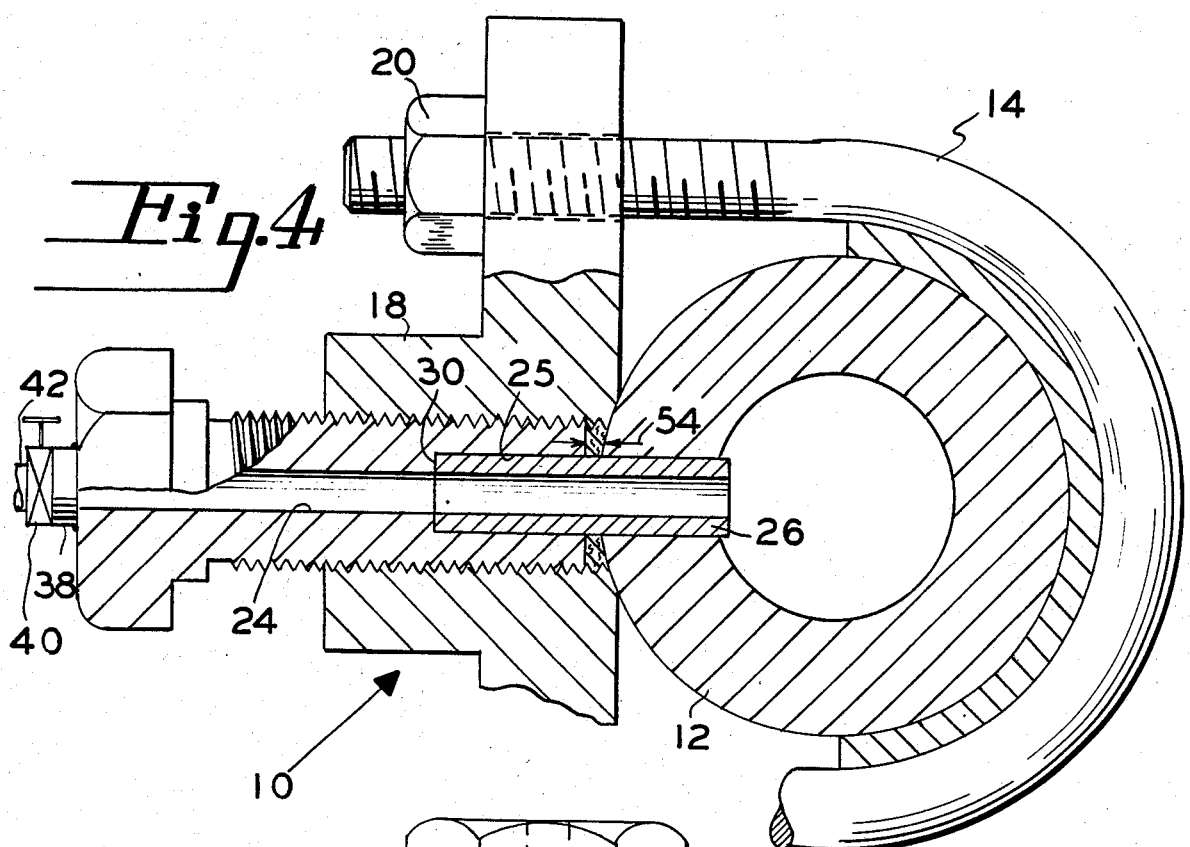
FIG. 4 is a further view similar to FIG. 3 upon additional advance of the penetrator bolt to the final operating position of the pipe tapping device.

The view of the punch assembly shown in FIG. 1 is as it would be immediately prior to commencement of the actual conduit piercing operation. Prior thereto and prior to threadably inserting the penetrator means 22 into the receiver 18, it will be understood that a drill jig bushing 44 (see FIG. 2) may preferably be threadably inserted in the receiver 18 so as to provide support for drilling a suitable aperture 34 in the side wall of the conduit 12. The bushing 44 includes external threads 46 for threadably engaging the receiver 18 and has defined therethrough an internal guide bore 48 which is of a diameter slightly larger than the associated drill employed for the boring of the recess 34. After drilling of the recess 34, it will be understood that the drill jig bushing 44 is removed and the penetrator means 22 assembly inserted into the position shown in FIG. 1. Referring to FIG. 3 next it will be seen that the penetrator means 22 has been advanced inwardly in the receiver means to compact the seal packing 36 to dimension 50 and advance therewith the tubular pin means 26, in end contact with the punch 32, to a point where the end surface of the punch 32 is coincident with the inner wall of the conduit 12 and a punch slug 52 has been severed therefrom and is free to enter the interior of the conduit 12. In the event that slug 52 may adhere to the end of the punch 32, both may fall as a unit into the conduit interior upon further inward advance of pin 26. Upon further penetration by rotation of the bolt 22 as shown in FIG. 4, it can be seen how the packing 36 has been fully compressed to the dimension 54 to positively seal and grip against the outer periphery of the hollow pin 26 as well as seal against the outer surface of the conduit 12. At the same time, the further threading and insertion of the bolt 22 has advanced the end of the pin means 26 to be substantially flush with the interior wall of the conduit 12 and also advanced the punch 32 into the interior cavity of the conduit 12.

Figure 5:
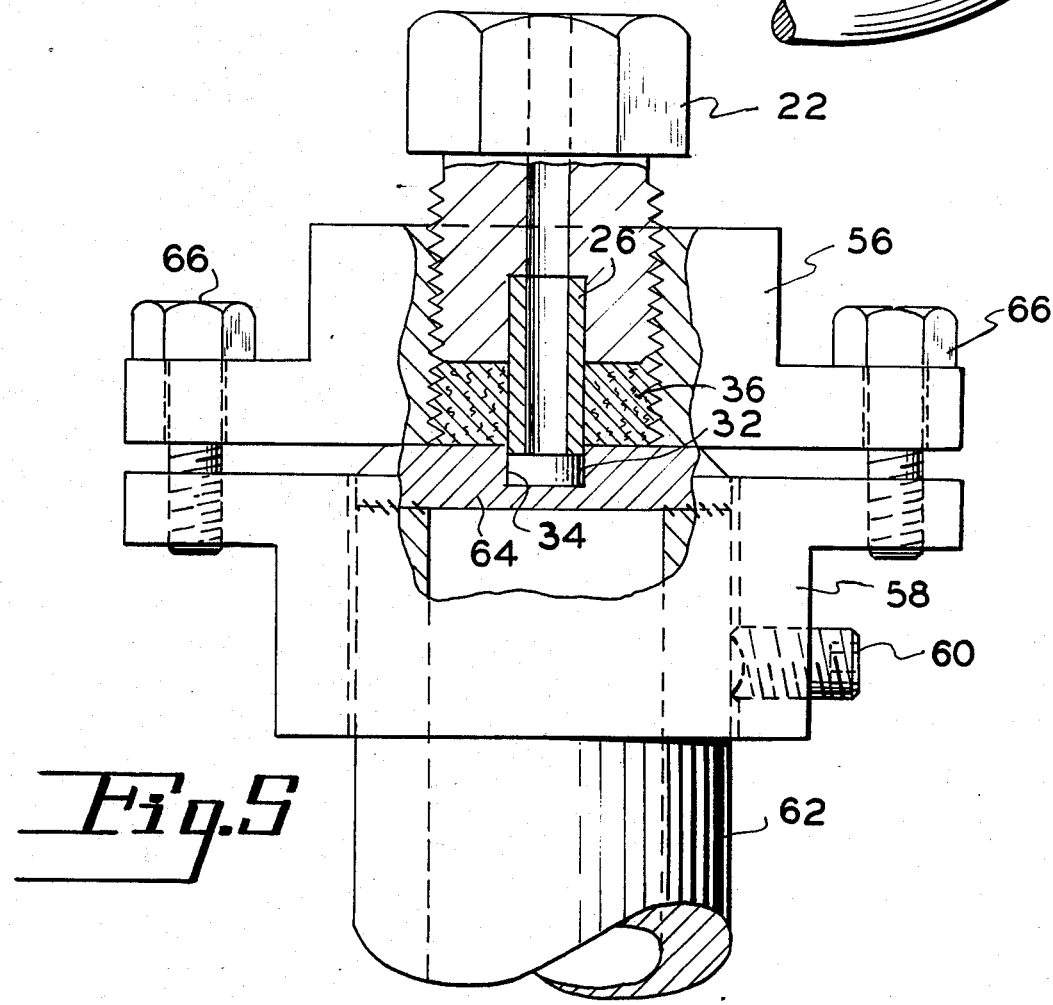
FIG. 5 is a view of another embodiment of the invention as it would be applied to pierce a flat end wall of a pipe or other fluid containing member.

Referring to FIG. 5, an alternate embodiment of the invention is shown as it would be adapted to punch an aperture in a flat end plate covering the end of the conduit 62. The end plate designated 64 is weldably secured to the upper end of the conduit 62. In this embodiment an endplate receiver means designated 56 is secured by a plurality of bolts 66 to an end flange 58 placed over the end of conduit 62 and held thereto by a plurality of set screws 60. It will be seen that the similar parts employed in this embodiment have been designated with like reference numerals and that FIG. 5 corresponds to the relative positions of the parts immediately prior to the initiation of the actual punch shearing of the plate 64 and as such corresponds to the view shown in FIG. 1 of the first described embodiment of applicants' invention. In any event, those skilled in the art will appreciate that the embodiment of FIG. 5 will operate in the same way as previously described with respect to FIGS. 3 and 4.

As will be appreciated by those skilled in the art, the operation of both embodiments of the invention in accomplishing the piercing of the conduit wall is such that as the penetrator means 22 is linearly advanced within the threaded bore of the receiver 18, the intermediate and tubular pin means 26 is free to rotate as determined by the relative frictions between it and the receiver 22 and with the packing 36. In any event, as the packing 36 is gradually compressed to the dimensions shown at 50 and its final dimension as shown at 54 (see FIG. 3) the pin 26 will gradually begin to rotate with the penetrator means 22 but the end friction on the punch 32 against the recess 34 in the conduit 12 will be in excess of the interfacial friction between the end of the pin 27 and the punch and no rotation of the punch 22 will occur as it is linearly advanced to punch the desired aperture in the conduit 12. Accordingly, those skilled in the art will appreciate that the linear advance of the punch 32, without rotation, through the wall of the vessel is effective to load the punch 32 primarily in compression without any substantial torsional loads thereon. This accomplishes nice clean mechanical shearing of the wall thickness of the conduit 12.

While two specific embodiments of the invention have been shown and described in detail to illustrate the application of the inventive principles, it will be understood that the invention may be embodied otherwise without departing from such principles. For instance, while the invention has been shown in connection with piercing of a wall of a conduit pipe, those skilled in the art will readily appreciate that any fluid-containing vessel could be pierced with the inventive arrangement to place the vessel in fluid communication with another fluid passageway through the penetrator means. Furthermore, while in the particular arrangement of conduit 12, with relatively large wall thickness, requires that a recess 34 for the punch 32 be pre-drilled, such would not be necessary wherein the shear strength of the pipe wall thickness would be relatively low compared to the overall rigidity of the conduit.

What is claimed is:

1. An improved assembly for forming a hole in the wall of a vessel or conduit comprising:

a pair of spaced "U" bolts surrounding said vessel or conduit;

receiver means engaging the ends of said "U" bolts;

means cooperative with said "U" bolts securing said receiver means in compression against an exterior surface of said vessel or conduit;

penetrator means threadably engaging a threaded aperture in said receiver means, said penetrator means including a central aperture therethrough having an enlarged bore section;

hollow tubular pin means disposed within said enlarged bore section of said penetrator means, said pin means being of sufficient length to extend beyond the end of said penetrator means to provide means for locating a seal packing material thereon, prior to threading said penetrator means into said receiver means;

a seal packing material about the extending end portion of said pin means; and a cylindrical punch aligned with and contacting the extending end of said pin means, said punch being adapted to fit into a corresponding recess previously made in said vessel or conduit, whereby upon rotation of said penetrator means said packing material will be compressed to form a seal between said vessel or conduit and said receiver means and the pin means, and at the same time linearly advancing said punch without rotation through the wall of said vessel or conduit to punch an aperture therein.

2. The combination of claim 1 wherein said seal packing material comprises a seal packing ribbon spirally wrapped about said pin means.

3. The combination of claim 1 wherein the pin means is free to rotate within the penetrator means and relative to said punch during operation whereby the loading on said punch is mainly in compression and torsional loads thereon are substantially reduced.

4. An improved assembly for forming a hole in a fluid containing member comprising:

receiver means adapted to be connected to said fluid containing member;

penetrator means threadably engaging a threaded aperture in said receiver means, said penetrator means including a central aperture therethrough having an enlarged bore section;

hollow tubular pin means disposed within said enlarged bore section of said penetrator means, said pin means being of sufficient length to extend beyond the end of said penetrator means to provide means for locating a seal packing material thereabout;

a seal packing material about the extending end portion of said pin means; and a cylindrical punch aligned with and contacting the extending end of said pin means, whereby upon rotation of said penetrator means said packing material will be compressed to form a seal between said fluid containing member and said receiver means and the pin means, and at the same time linearly advancing said punch without rotation thereof into the wall of said fluid containing member to punch an aperture therein.

5. The combination of claim 4 wherein said receiver means includes an end flange adapted to be attached to a closed end portion of a pipe conduit fluid containing member.

6. The combination of claim 5 wherein said seal packing material comprises a seal packing ribbon spirally wrapped about said pin means.

7. The combination of claim 5 wherein the pin means is free to rotate within the penetrator means and relative to said punch during operation whereby the loading on said punch is mainly in compression and torsional loads thereon are substantially reduced.

8. The combination of claim 4 wherein said receiver means includes at least one "U" bolt means for securing said assembly to said fluid containing member.

9. The combination of claim 8 wherein said seal packing material comprises a seal packing ribbon spirally wrapped about said pin means.

10. The combination of claim 8 wherein the pin means is free to rotate within the penetrator means and relative to said punch during operation whereby the loading on said punch is mainly in compression and torsional loads thereon are substantially reduced.

11. An improved method for forming a hole in a fluid containing member comprising the steps of:

attaching a threaded receiver means to said fluid containing member;

threading a drill jig bushing into said receiver means;

drilling a cylindrical recess partially through the wall thickness of said fluid containing member;

removing said drill jig bushing from said receiver means;

wrapping a ribbon seal packing material about the protruding end of a rotatable hollow pin member located in a threaded penetrator bolt;

inserting a cylindrical punch in said cylindrical recess;

threading said penetrator bolt into said receiver means to thereby compress said packing material about said pin member and against the outer wall of said fluid containing member surrounding said cylindrical recess; and further threading said penetrator bolt into said receiver means to advance the end of said pin against the punch to cause said punch to penetrate the wall of said fluid containing member.

* * * * *